United States Patent Office 3,405,182
Patented Oct. 8, 1968

3,405,182
METHOD FOR THE PRODUCTION OF ALKYLENE POLYTHIOETHER THIOLS
Bernard Gourdon, Pau, France, assignor to Societe Nationale des Petroles d'Aquitaine, Paris, France
No Drawing. Filed Mar. 15, 1965, Ser. No. 439,999
Claims priority, application France, Mar. 16, 1964, 967,516
3 Claims. (Cl. 260—609)

ABSTRACT OF THE DISCLOSURE

A method of preparing unsaturated alkylene polythioether thiols by reacting an alkyl diene with a polythioether thiol in the presence of a catalyst.

---

The new chemical products according to the invention are of use for synthesis of various sulphur-containing organic compounds; they can also be used as oily plasticizers. The substances are characterized by a chain containing —$CH_2S$— groups terminating in a SH function at one end and in a branched or unbranched alkylene radical at the other end. Generally, the new products according to the invention may be represented by the following formula:

$$HS-(CH_2S)_n-CH_2-R \qquad (1)$$

wherein R denotes an alkylene group, i.e., a hydrocarbon group containing a double bond.

In the products to which the present invention relates more particularly, the number $n$ of $CH_2S$ groups is generally from 2 to 7. Very useful products are mixtures of substances in which $n$ varies mainly between 3 and 4, the mean value of $n$ being approximately 3.5.

The alkylene radical R in the new products may contain a number of carbon atoms varying within wide limits, but usually between 3 and 30. In very useful practical polythioether thiols consisting of oily liquids the radical R contains 3 to 6 carbon atoms.

Thus R may be of the following form:

$$-(CH_2)_m-CH=CH-(CH_2)_p-CH_3$$

or $$-(CH_2)_r-CH=CH_2$$

the values of $m$, $p$ and $r$ being such that ($m+p+3$) is generally from 3 to 30 or ($r+2$) is equal to 3 to 30.

The synthesised compounds according to the invention may have various configurations. For example, when the diene used is isoprene, the following three isometric forms may be obtained for the radical R of Formula 1:

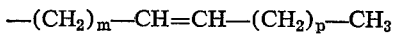

and

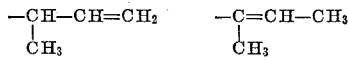

where $n$ is 2 to 7, principally 3 to 4.

A process for the preparation of the new products described comprises reacting one molecule of a diene with about one molecule of a polythioether dithiol.

In one specific embodiment of the new process, the polythioether dithiol used consists of one or more thioformaldehyde liquid oligomers $HS(CH_2S)_nH$ wherein $n$ may be from 2 to 7; excellent results have been obtained with a liquid wherein $n$ lies between 3 and 4.

A specific case of practical use industrially comprises reacting a molecule of a liquid mixture of the above polythioformaldehydes of a molecular weight equal to or about 190, with a molecule of a conjugate diene, more particularly butadiene or methylbutadiene.

New products according to the invention may also be prepared by combination of the above polythioether thiols and other conjugate diolefins, for example: 1,3-hexadiene; 1,3-heptadiene; 1,3-octadiene and 3,5-octadiene; 6-methyl 1,3-heptadiene; 1,3- and 4,6-dodecadiene; 2,4-dodecadiene; 3-propyl 1,3-undecadiene; 3-ethyl 1,3-decadiene; 2-ethyl 4,6-decadiene; 1,3-tetradecadiene; 3-ethyl 1,3-tetradecadiene; 7,9-heptadecadiene; 7-methyl 7,9-heptadecadiene; docosadiene.

The process according to the invention may also be applied to non-conjugate diolefins, for example: 1,5-hexadiene; 1,5-heptadiene; 1,7-octadiene; 5-methyl 1,5-heptadiene; 2-methyl 1,7-octadiene; 2,6-octadiene; 8-ethyl 1,8-decadiene; 10-ethyl 1,9-dodecadiene; 6-butyl 2,10-hexadecadiene; 1,6-docosadiene, etc. The addition reaction according to the invention may be performed in the presence or absence of a solvent at temperatures ranging between —20° C. and +180° C., but preferably between 15 and 50° C. It is performed in the presence of ionic or radical catalysts; for example, Friedel-Crafts type catalysts (Lewis acids) may be used, such as anhydrous $AlCl_3$, $BF_3$, etc., peroxides, or alternatively just ultraviolet rays may be used.

Various inert solvents may be used, inter alia aliphatic hydrocarbons, such as heptane, octane, petroleum oil, petroleum ether, cyclohexane, and more particularly aromatic hydrocarbons, more particularly benzene, toluene, xylene etc. The solvent chosen is inert with respect to the reagents and preferably its boiling point does not exceed 180° C.

The operation is carried out at atmospheric or higher pressure.

The method of operation preferably includes the use of a slight excess of diene, i.e., a little more than one molecule of ethylene hydrocarbon per molecule of polythioformaldehyde.

A practical means of following the reaction and determining its end comprises metering the SH function as the reaction progresses; the reaction is complete when half the initial SH has disappeared.

The invention will be illustrated by the following examples which have no limiting force.

EXAMPLE 1

1 litre of xylene was placed in a reactor provided with an effective agitator and condenser. 190 g. of liquid polythioformaldehyde of the above-mentioned formula, the number $n$ being 3.65, was then added and then 68 g. of freshly distilled isoprene was introduced, i.e., 2-methyl 1,3-butadiene, and 5 g. of anhydrous aluminum chloride. The mixture was agitated for 8 hours, the temperature being kept at 22° C. for the entire operation.

After evaporation of the xylene, the collected product after washing with water and drying weighed 206 g. Its molecular weight determined by cryoscopy in benzene was found to be 270.

Elementary analysis gave the following results:

| Found | Calculated for— | |
|---|---|---|
| | n=3 | n=4 |
| C, 39.13% i.e. 9.8 atoms/mole as against | 8 | 9 |
| H, 7.38% i.e. 19.9 atoms/mole as against | 16 | 18 |
| S, 55.87% i.e. 4.71 atoms/mole as against | 4 | 5 |

The SH content was found to be 12.8%, i.e. 0.98 SH equivalent per molecule.

The iodine number found indicates the presence of a double bond per molecule and this is confirmed by the infrared spectrum.

These results show that the substance obtained is a pentene polythioether thiol ($CH_2R$ being a pentene radical) corresponding to the above Formula 1 wherein $n$ is approximately 3.7; in fact $n$ was found to be 3.65 by calculation from the molecular weight of 270, while the S and SH analysis gives an $n$ of $4.71-0.98=3.73$.

We may therefore assume that the reaction is as follows:

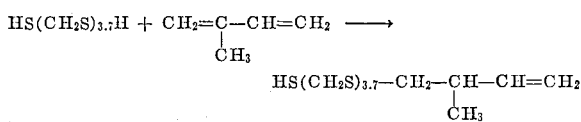

At 20° C., the product prepared had a specific gravity of 1.207 and a refractive index of 1.6185.

EXAMPLE 2

A similar operation to that described in Example 1 was carried out for 8 hours between 20° and 25° C. with the same quantities of reagent but with a catalyst consisting of 5 g. of benzoyl peroxide with 15 g. of acetic acid instead of aluminium chloride.

The oily product obtained had the following analysis:

| | Percent |
|---|---|
| C | 38.29 |
| H | 6.94 |
| S | 54.8 |

EXAMPLE 3

The following were added successively to a flask exposed to daylight:

1 mole of liquid thioformaldehyde oligomer having a molecular weight of 210
68 g. of freshly distilled isoprene.

The hermetically sealed bottle was kept at 20° C. Initially there was no mixing of the two liquids but such mixing gradually occurs and after an hour and a half contact time there was only one liquid phase in the bottle.

After 8½ hours an oily product was withdrawn from the bottle, its sulphur content being 55% and its SH content 11.9%. The molecular weight determined by cryoscopy in benzene was 280. The iodine number found indicated the presence of a double bond per molecule.

Infrared analysis of this product indicated the presence of the SH group and of the double bond. The refractive index at 20° C. of the product was 1.6175 and its specific gravity 1.207.

EXAMPLE 4

218 g. of polythioformaldehyde oligomers comprising 4 $CH_2S$ groups and 54 g. of 1,3-butadiene were introduced into a bottle provided with means for maintaining pressures in excess of atmospheric pressure. After 30 hours of exposure to ultra-violet sunlight, an unsaturated polyether thiol was obtained containing the following:

1 SH function—11.8%
1 double bond—iodine number: 0.95
Molecular weight by cryoscopy in $C_6H_6$—273 g.
Microanalysis—

| | Percent |
|---|---|
| C | 35 |
| H | 5.85 |
| S | 58.50 |
| | 99.35 |

EXAMPLE 5

5.36 g. of polythioformaldehyde oligomer ($n=4$ groups) and 1.08 kg. of 1,3-butadiene in 10 kg. of cyclohexane were introduced into a vitrified Pfaudler-type reactor adapted to withstand pressure very much in excess of atmospheric pressure. The catalyst used was anhydrous aluminium chloride (100 g.). The mixture was agitated for 10 hours at 30° C. After elimination of the solvent, the collected product after washing and drying had a molecular weight of 277 g., 1 SH function of 11.75% and one double bond.

EXAMPLE 6

Toluene, 190 g. of liquid polythioformaldehyde $$(n=3.65)$$

and 68 g. of freshly distilled isoprene are used in the identical apparatus to that described in Example 1. The system is agitated for 2 hours at 20° C. and then 10 g. of azo-bis-isobutyronitrile is added. The mixture is heated to 100° C. At the end of 30 minutes, after elimination of the toluene, the unsaturated polythioether thiol is obtained, which, after washing and drying, had a molecular weight of 271.

I claim:

1. A method for producing unsaturated aliphatic polythioether thiols which consists in mixing one mole of an alkyl diene with two —CH=CH— groups and having 3 to 30 carbon atoms in its molecule with about 1 mole of polythioether thiol having 2 to 7 —$CH_2S$— groupings, subjecting the mixture to the catalytic action of a substance selected from the class conisting of Lewis acids and catalysts providing free radicals, while keeping the mixture at a temperature in the range from —20° C. to +180° C. until a substantial amount of unsaturated aliphatic polythioether thiols is formed, and then separating the thiols from the reaction mixture.

2. A method as recited in claim 1, wherein the diene and the polythioether thiol are first dissolved in at least one hydrocarbon which is chemically inert with respect to the components of said mixture, the boiling point of the hydrocarbon being not in excess of 180° C.

3. A method for producing unsaturated aliphatic polythioether thiols which consists in mixing one mole of an alkyl diene with two —CH=CH— groups and having 3 to 30 carbon atoms in its molecule with about 1 mole of polythioether thiol having 2 to 7 —$CH_2S$— groupings, subjecting the mixture to ultraviolet radiation, while keeping the mixture at a temperature in the range from —20° C. to +180° C. until a substantial amount of unsaturated aliphatic polythioether thiols is formed, and then separating the thiols from the reaction mixture.

References Cited

UNITED STATES PATENTS 2,454,409  11/1948  Schulze et al. _____ 260—609

OTHER REFERENCES

Reid: Organic Chemistry of Bivalent Sulfur, vol. II, pp. 30, 31, 34 (1960) QD 412 SIR 4 C.2.

CHARLES B. PARKER, *Primary Examiner.*

D. R. PHILLIPS, *Assistant Examiner.*